United States Patent [19]

Usui

[11] Patent Number: 4,858,964
[45] Date of Patent: Aug. 22, 1989

[54] T-JOINT FOR CONNECTING BRANCH PIPE

[75] Inventor: Masayoshi Usui, Numazu, Japan

[73] Assignee: Usui Kokusai Sangyo Kaisha Ltd., Sunto, Japan

[21] Appl. No.: 171,669

[22] Filed: Mar. 22, 1988

[51] Int. Cl.$^4$ ............................................. F16L 41/00
[52] U.S. Cl. ................................. 285/156; 285/197; 285/319; 285/921
[58] Field of Search ............... 285/156, 197, 319, 921

[56] References Cited

U.S. PATENT DOCUMENTS

| | | | |
|---|---|---|---|
| 3,218,093 | 11/1965 | Carlson | 285/197 |
| 3,455,579 | 7/1969 | Olliff, Jr. et al. | 285/319 X |
| 3,638,972 | 2/1972 | Alpine | 285/197 X |
| 3,672,162 | 6/1972 | Rygelis et al. | 285/319 X |
| 4,026,581 | 5/1977 | Pasbrig | 285/319 X |
| 4,045,060 | 8/1977 | Daigle | 285/156 X |

FOREIGN PATENT DOCUMENTS

| | | | |
|---|---|---|---|
| 517325 | 1/1940 | United Kingdom | 285/156 |
| 1055027 | 1/1967 | United Kingdom | 285/156 |

Primary Examiner—Thomas F. Callaghan
Attorney, Agent, or Firm—Anthony J. Casella; Gerald E. Hespos

[57] ABSTRACT

According to the present invention, there is provided a T-joint for connecting a branch pipe which comprises: a linear piping wall with a through hole, which is penetrated by and fitted with a main pipe, and a branch piping wall for connecting a branch pipe communicating with the piping wall perpendicularly thereto, wherein the piping wall with the through hole and the branch piping wall are integrally formed, annular grooves are arranged on a peripheral surface of the piping wall with the through hole on the right- and left-hand sides thereof adjacent to its opening and on a peripheral surface of the branch piping wall adjacent to its opening, respectively, and elastic O-rings are inserted into the respective annular grooves, while an engaging mechanism engaging with an outer peripheral surface of the branch pipe is arranged near an end portion of the peripheral surface of the opening in the branch piping wall, and a plurality of axial slits are arranged in the branch piping wall.

5 Claims, 1 Drawing Sheet

PRIOR ART

T-JOINT FOR CONNECTING BRANCH PIPE

BACKGROUND OF THE INVENTION

1. Field of the Invention

The present invention generally relates to improvements of the structure of a T-joint for connecting a metal branch pipe which has a relatively thin wall thickness of about 1.5 mm or less and a small diameter of about 20 mm or less and is frequently used for automobiles, various kinds of machines, facilities, equipment, and the like, as a branch pipe for supplying oil, air or similar.

2. Description of the Prior Art

Conventionally in this kind of T-joint, as illustrated in FIG. 4, a joint body is arranged as follows: A metal piping material is cut to a short length, and a communicating opening 12 is provided in a substantially central portion of a peripheral wall thereof to form a piping wall 11, which is formed by cutting a metal piping material to a short length and in which a saddle-like curved wall 14 is formed by expanding one end thereof outwardly, is fitted on the piping wall 11 such as to communicate with the communicating opening 12 thereof. Contact surfaces of these members are then fused by means of brazing 15.

$P_1$ denotes a main pipe which is installed in the piping wall 11 in such a manner as to penetrate the interior thereof and is fused therein by means of brazing $W_1$ with end peripheries of the pipe 11. $P_2$ denotes a branch pipe which is connected to the branch piping wall 13 such as to communicated therewith, brazed at $W_2$ with the end peripheries of the branch piping wall, and includes a round opening $B_1$ bored in correspondence with the communicating opening 12.

However, in conventional T-joints such as one described above, an operating efficiency is remarkably deteriorated, since for the sake of brazing along the curved wall 14 the communicating opening 12, branch pipe $P_2$ and round opening $M_1$ need to be temporalily fitted with each other after positioning them relative to one another, in terms of a brazed structure of different bodies of the cylindrical wall 11 and branch piping wall 13. Also, in a conventional T-joint, there are problems such as a possibility of leak induced by a poor brazing performance using a burner on mutually curved contact surfaces over cylindrical surfaces, a deterioration of mechanical strength of the brazed part caused by a partial overheating, or frequent cracking and bending caused by vibration during arrangement and use of the joint.

Further, productivity is subject to a remarkable deterioration owing to leak, cracking or bending of the joint in the same way as described above because of its structure in which the main pipe $P_1$ and the branch pipe $P_2$ are connected to each other by means of brazing at $W_1$ and $W_2$.

SUMMARY OF THE INVENTION

In order to effectively solve the above-described problems, an object of the present invention is to provide a T-joint constituted in such a manner that a joint body is integrally formed so that no brazing is required and, a main pipe and a branch pipe are fittingly inserted in the interior of the piping wall and the branch piping wall to facilitate easy installation and connection while securely maintaining airtightness thereof, thereby overcoming the possibilities of cracking or bending.

To this end, according to the present invention, there is provided a T-joint for connecting a branch pipe, comprising a linear piping wall with a through hole, which is penetrated by and fitted with a main pipe, and a branch piping wall for connecting a branch pipe communicating with the piping wall perpendicularly thereto, wherein the piping wall with the through hole and the branch piping wall are integrally formed, annular grooves are arranged on a peripheral surface of the piping wall with the through hole on the right- and left-hand sides thereof adjacent to its opening and on a peripheral surface of the branch piping wall adjacent to its opening, respectively, and elastic O-rings are inserted into the respective annular grooves, while an engaging mechanism engaging with an outer peripheral surface of the branch pipe is arranged near an end portion of the peripheral surface of the opening in the branch piping wall, and a plurality of axial slits are arranged in the branch piping wall.

DESCRIPTION OF THE PREFERRED EMBODIMENTS

Figure 1:
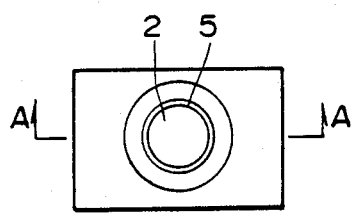
FIG. 1 is a top view of a T-joint for connection with a branch pipe according to one embodiment of the present invention.
Figure 2:
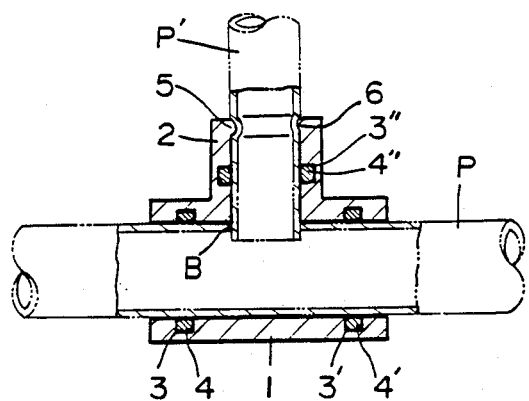
FIG. 2 is a partially cut-away, vertical cross-sectional view of an assembly of a main pipe and a branch pipe in a connected state, taken along the line A—A shown in FIG. 1.
Figure 3:
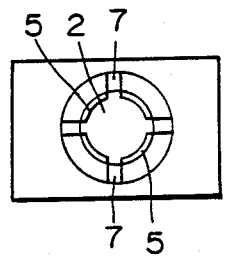
FIG. 3 is a top view of a T-joint for connectiong with a branch pipe according to another embodiment of the present invention which is equivalent to that shown in FIG. 1.
Figure 4:
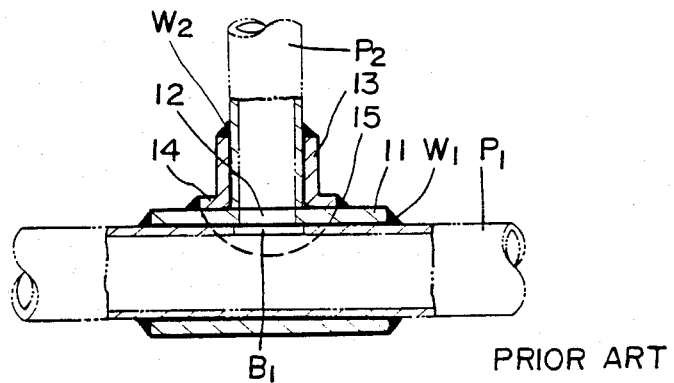
FIG. 4 is a partially cut-away, cross-sectional view of a conventional assembly of the main pipe and the branch pipe in a connected state.

In FIGS. 1 to 3, reference numeral 1 denotes a linear piping wall with a through hole which is fitted such that a main pipe P penetrates the same. This wall constitutes an integrally-formed T-joint which comprises a branch piping wall 2 for connecting a branch pipe P' which is orthogonal with the penetrating piping wall and communicates with the inside thereof. Reference numerals 3, 3' and 3" denote annular grooves arranged on the peripheral surface of the piping wall 1 with the through hole on the right- and left-hand sides thereof adjacent to its openings and on a peripheral surface of the branch piping wall 2 adjacent to its opening, respectively. Elastic O-rings 4, 4' and 4" are inserted in these grooves 3, 3' and 3", respectively. Reference numeral 5 denotes an annular protruding wall for engaging which is disposed in proximity to an end portion of the peripheral surface of the branch piping wall 2 adjacent to its opening. This protruding wall 5 is engaged with an annular groove 6 formed on the outer peripheral surface of the branch pipe P'. Reference numeral 7 denotes a plurality of axial slits disposed in the branch piping wall 2, whereby engagement by the engaging protruding 5 is effected more resiliently.

Because of the configuration of the present invention as described above, the main pipe P is installed in the piping wall 1 in an inserting manner such that a round opening B bored in advance in a part of the peripheral wall of the main pipe P is aligned with a branch opening of the branch piping wall 2. Connection is effected by fittingly inserting the branch pipe P' into the branch opening in the branch piping wall 2 and into the round opening B. Then, the outer peripheral surfaces of the main pipe P and the branch pipe P' are hermetically sealed securely with the elastic O-rings 4, 4' and 4" which are fitted on the peripheral surface of the piping wall 1 with the through hole on the right- and left-hand sides thereof adjacent to its openings and the peripheral surface of the branch piping wall 2 adjacent to its opening. In addition, after the branch piping wall 2 is subjected to resilient deformation as a result of insertion of the branch pipe P' and is then restituted, the protruding wall 5 is hence caused to engage the groove 6 on the outer peripheral surface of the branch pipe P', thereby effecting connection.

As described above, in a remarkably useful T-joint for connecting a branch pipe according to the present invention, the joint body is formed into an integral shape, and the main pipe P and the branch pipe P' are assembled together or connected to each other with only a insertion into the joint, using the elastic O-rings 4, 4' and 4" which are fitted on the peripheral surface of the piping wall 1 on the right- and left-hand sides thereof adjacent to its openings and the peripheral surface of the branch piping wall 2 adjacent to its opening. As a result, no brazing is required. At the same time, a sealing performance is enhanced by virtue of the sealing effect of the elastic O-rings 4, 4' and 4", whereby possibilities of cracking, bending, leak or the like caused by deterioration of mechanical strength are overcome and, the branch pipe P' can be stably connected by means of the engaging mechanism for engagement between the protruding wall 5 and the annular groove 6.

What is claimed is:

1. A T-joint for connecting an end of a branch pipe to a main pipe having a peripheral opening such that the end of the branch pipe is retained in the peripheral opening of the main pipe, said branch pipe comprising an inwardly formed annular locking groove at a location thereon spaced from the end thereof, said T-joint comprising:
    a linear main piping wall with opposed longitudinal ends and a through hole extending therebetween, said through hole being penetrated and fitted with the main pipe, the through hole in the main pipe wall being characterized by annular grooves spaced inwardly from the respective opposed longitudinal ends thereof, with elastic O-rings being engaged in said grooves; and
    a branch piping wall integral with said main piping wall for receiving the branch pipe, said branch piping wall being arranged perpendicularly to said main piping wall and communicating with the through hole of said main piping wall, such that the end of said branch pipe received in the branch piping wall can be inserted into the peripheral opening in said main pipe fitted in the through hole of said main piping wall, said branch piping wall comprising an inwardly protruding engaging wall at a location thereon spaced from said main piping wall for engaging the annular groove formed in said branch pipe, said branch piping wall further being characterized by an interiorly disposed annular groove intermediate the main piping wall and the inwardly protruding engaging wall, with an elastic O-ring being retained in said annular groove of said branch piping wall, whereby said branch pipe is securely retained in communication with the main pipe by the interengagement of the inwardly protruding engaging wall of said branch piping wall with the annular groove formed in said branch pipe.

2. A T-joint according to claim 1, wherein said branch piping wall is provided with a plurality of slits which extend in the axial direction thereof.

3. A T-joint connection comprising:
    a main pipe having a generally cylindrical side wall with a generally round opening formed in said peripheral side wall;
    an integrally formed T-joint comprising a linear main piping wall with opposed longitudinal ends and a through hole extending therebetween, said through hole being characterized by outwardly extending generally annular grooves spaced inwardly from the respective opposed longitudinal ends of said main piping wall for receiving elastic O-rings therein, said T-joint further comprising a generally cylindrical branch piping wall aligned perpendicularly to said main piping wall and communicating with the through hole, said branch piping wall comprising an end spaced from said main piping wall, said end of said branch piping wall comprising an inwardly protruding engaging wall extending generally thereabout, said branch piping wall being further characterized by an interiorly disposed outwardly extending generally annular groove for receiving an elastic O-ring therein, said main pipe being mounted in the through hole such that said main pipe extends beyond the respective opposed longitudinal ends of said main piping wall and such that the round opening in the peripheral wall of said main pipe is generally aligned with the branch piping wall of said T-joint; and
    a generally cylindrical branch pipe having an inwardly directed annular groove formed at a location therealong spaced from an end of said branch pipe, said branch pipe being securely mounted in the branch piping wall such that the end of said branch pipe extends into the round opening formed in the peripheral wall of said main pipe and such that the inwardly protruding engaging wall of said branch piping wall lockingly engages the inwardly directed annular groove formed in said branch pipe, whereby said T-joint connection is assembled by merely inserting the branch pipe into the branch piping wall of said integrally formed T-joint.

4. A T-joint connection as in claim 3 wherein said branch piping wall is characterized by generally axially extending slits extending from the end thereof to a location intermediate said end and the outwardly extending annular groove therein.

5. A T-joint connection as in claim 3 further comprising elastic O-rings mounted respectively in the outwardly extending grooves of said integrally formed T-joint.

* * * * *